United States Patent
Scott et al.

(10) Patent No.: US 10,569,881 B2
(45) Date of Patent: Feb. 25, 2020

(54) STAGGERED AIRCRAFT SEAT ASSEMBLY

(71) Applicant: Molon Labe LLC, Breckenridge, CO (US)

(72) Inventors: Frank Matthew Scott, Breckenridge, CO (US); Kevin Lee Van Liere, Louisville, CO (US)

(73) Assignee: Molon Labe, LLC, Breckenridge, CO (US)

( * ) Notice: Subject to any disclaimer, the term of this patent is extended or adjusted under 35 U.S.C. 154(b) by 255 days.

(21) Appl. No.: 15/695,797

(22) Filed: Sep. 5, 2017

(65) Prior Publication Data
US 2018/0105272 A1 Apr. 19, 2018

Related U.S. Application Data

(60) Provisional application No. 62/409,493, filed on Oct. 18, 2016.

(51) Int. Cl.
*B64D 11/06* (2006.01)
*B60N 2/75* (2018.01)

(52) U.S. Cl.
CPC ...... *B64D 11/0601* (2014.12); *B64D 11/0646* (2014.12); *B60N 2/75* (2018.02); *B64D 11/06* (2013.01); *B64D 11/0644* (2014.12)

(58) Field of Classification Search
CPC ............ B64D 11/0601; B64D 11/0644; B64D 11/0646; B64D 11/06; B60N 2/75
USPC ...................................... 297/232, 248, 411.2
See application file for complete search history.

(56) References Cited

U.S. PATENT DOCUMENTS

| | | |
|---|---|---|
| 151,411 A | 5/1874 | Marshall |
| 371,091 A | 10/1887 | Miller |
| 972,393 A | 10/1910 | Moore |
| 1,643,236 A | 9/1927 | Bell |
| 1,714,645 A | 5/1929 | Taggart |
| 2,026,016 A | 12/1935 | Blood |

(Continued)

FOREIGN PATENT DOCUMENTS

| | | |
|---|---|---|
| CN | 102015358 A | 4/2011 |
| CN | 102753436 A | 10/2012 |

(Continued)

OTHER PUBLICATIONS

"Molon Labe Rethinks the Middle Seat with Staggered Seating Options" Mar. 23, 2017, apex.aero, site visited Jan. 3, 2019, <https://apex.aero/2017/03/23/molon-labe-rethinks-middle-seat-staggered-seating-options> (Year: 2017), 1 pp.

(Continued)

*Primary Examiner* — Syed A Islam
(74) *Attorney, Agent, or Firm* — James A. Sheridan; Sheridan Law, LLC

(57) ABSTRACT

A multiple seat set for use in a transport vehicle such as an aircraft is disclosed. The seat set increases seating room and comfort for passengers without increasing the footprint of the seat set. The seat set includes a staggered seating arrangement where seating surfaces of adjacent seats are disposed in alternating heights (e.g., vertical heights) while the seating surfaces and seat backs of such adjacent seats are disposed in alternating forward and back positions. The staggering of the seat surfaces and seat backs results in misalignment of shoulders and hips of passengers in adjacent seats.

16 Claims, 11 Drawing Sheets

(56) References Cited

U.S. PATENT DOCUMENTS

| | | |
|---|---|---|
| 2,116,366 A | 5/1938 | Scott |
| 2,523,960 A | 9/1950 | Lijengren et al. |
| 2,696,246 A | 12/1954 | Louis |
| D180,972 S | 9/1957 | Umanoff |
| D180,975 S | 9/1957 | Umanoff |
| 3,050,333 A * | 8/1962 | Smith ............... B60N 2/26 296/64 |
| 3,572,615 A | 3/1971 | Firestone |
| 3,638,997 A | 2/1972 | Shapiro et al. |
| 3,887,230 A | 6/1975 | Groning et al. |
| 3,893,729 A | 7/1975 | Sherman et al. |
| 4,113,311 A | 9/1978 | Reida |
| D268,973 S | 5/1983 | White |
| 4,382,628 A | 5/1983 | Palmgren |
| D274,138 S | 6/1984 | Grussner |
| D296,094 S | 6/1988 | Sheek |
| 4,881,702 A | 11/1989 | Slettebak |
| 4,936,620 A | 6/1990 | Francois et al. |
| 5,104,065 A | 4/1992 | Daharsh et al. |
| 5,131,607 A | 7/1992 | Arnold et al. |
| 5,155,519 A | 10/1992 | Tokunaga |
| 5,178,345 A | 1/1993 | Peltola et al. |
| D338,791 S | 8/1993 | Cohen |
| 5,284,379 A | 2/1994 | Arnold et al. |
| 5,342,111 A | 8/1994 | Charles |
| D356,641 S | 3/1995 | Stewart |
| 5,509,722 A | 4/1996 | Beroth |
| 5,527,093 A | 6/1996 | Park |
| 5,558,309 A | 9/1996 | Marechal |
| D376,060 S | 12/1996 | Cohen |
| 5,584,532 A | 12/1996 | Marechal |
| 5,597,139 A | 1/1997 | Beroth |
| 5,660,434 A | 8/1997 | Nicksic |
| 5,660,436 A | 8/1997 | Wilson |
| 5,673,973 A | 10/1997 | Marechal |
| 5,727,845 A | 3/1998 | Ackson-Wynch |
| 5,829,836 A | 11/1998 | Schumacher et al. |
| 6,554,364 B1 | 4/2003 | Dammermann et al. |
| 6,644,441 B1 | 11/2003 | Ebrahimi |
| 6,824,213 B2 | 11/2004 | Skelly |
| 7,070,149 B2 | 7/2006 | McDonnell |
| D543,737 S | 6/2007 | Held |
| D547,981 S | 8/2007 | Cohen |
| 7,252,569 B2 | 8/2007 | Everhart et al. |
| D557,949 S | 12/2007 | Moorhouse |
| 7,410,127 B1 | 8/2008 | Ahad |
| D577,499 S | 9/2008 | Tsay |
| 7,448,575 B2 | 11/2008 | Cheung et al. |
| 7,578,551 B2 | 8/2009 | Linero |
| D605,863 S | 12/2009 | Aruga |
| 7,828,390 B2 | 11/2010 | Liu |
| 7,959,231 B2 * | 6/2011 | Lee ............... B60N 2/75 297/411.2 |
| 8,002,357 B2 | 8/2011 | Cebula |
| D645,681 S | 9/2011 | Grell |
| 8,091,961 B2 | 1/2012 | Dryburgh |
| 8,118,359 B2 | 2/2012 | Kyogoku et al. |
| 8,162,396 B2 | 4/2012 | Edwards |
| 8,172,321 B2 | 5/2012 | Hankinson et al. |
| 8,182,014 B2 | 5/2012 | Mabuchi et al. |
| D665,588 S | 8/2012 | Wada |
| 8,251,427 B2 | 8/2012 | Lindsay |
| 8,393,677 B2 | 3/2013 | Wieclawski |
| 8,393,680 B2 | 3/2013 | Zimmermann et al. |
| 8,419,135 B2 | 4/2013 | Moeseneder et al. |
| D686,422 S | 7/2013 | Robinson |
| 8,506,015 B2 | 8/2013 | Le et al. |
| D693,617 S | 11/2013 | Koski |
| 8,616,631 B2 | 12/2013 | Westerink et al. |
| 8,678,311 B2 | 3/2014 | Cheung et al. |
| 8,708,410 B2 * | 4/2014 | Scott ............... B64D 11/06 297/236 |
| 8,718,550 B2 | 5/2014 | Zhao et al. |
| 8,673,954 B2 | 7/2014 | Rajasingham |
| 8,864,071 B2 | 10/2014 | Vergnaud et al. |
| 8,888,160 B2 | 11/2014 | Woodhouse et al. |
| 8,931,846 B2 | 1/2015 | Merensky |
| 8,950,796 B2 | 2/2015 | Woodhouse et al. |
| D723,822 S | 3/2015 | Cai |
| D724,338 S | 3/2015 | Nicholas |
| D724,339 S | 3/2015 | Cai |
| 8,973,966 B2 | 3/2015 | Woodhouse et al. |
| 8,998,139 B2 | 4/2015 | Dryburgh et al. |
| 9,060,614 B1 | 6/2015 | Gibilterra |
| D733,442 S | 7/2015 | Dryburgh et al. |
| 9,102,243 B2 | 8/2015 | Woodhouse et al. |
| 9,132,918 B2 | 9/2015 | Bamford et al. |
| D750,392 S | 3/2016 | Wilkens |
| 9,315,270 B2 | 4/2016 | Dryburgh et al. |
| 9,346,504 B2 | 5/2016 | Segato |
| 9,358,908 B2 | 6/2016 | Rajasingham |
| 9,359,079 B2 | 6/2016 | Scott et al. |
| 9,398,812 B2 | 7/2016 | Sanae |
| 9,428,088 B1 | 8/2016 | Rajasingham |
| 9,446,686 B2 | 9/2016 | Woodhouse et al. |
| 9,475,407 B2 | 10/2016 | Byun |
| 9,511,694 B2 | 12/2016 | Mendicino et al. |
| 9,533,765 B2 | 1/2017 | Vergnaud et al. |
| 9,623,776 B2 | 4/2017 | Colsky |
| 9,630,717 B2 | 4/2017 | Wilkens |
| 9,682,643 B2 | 6/2017 | Wegenka et al. |
| 9,764,844 B2 | 9/2017 | Le et al. |
| 9,771,156 B2 | 9/2017 | Brownjohn et al. |
| 9,796,296 B2 | 10/2017 | Cailleteau |
| 9,821,691 B2 | 11/2017 | Brockman |
| 9,828,101 B2 | 11/2017 | Shih |
| 9,834,308 B2 | 12/2017 | Henshaw |
| 9,908,445 B2 | 3/2018 | Park et al. |
| 9,925,895 B2 | 3/2018 | Ellis et al. |
| 10,017,255 B2 | 7/2018 | Smallhorn |
| 10,035,433 B2 | 7/2018 | Muraiti et al. |
| 10,035,599 B2 | 7/2018 | Ruiz Lara et al. |
| 2002/0033432 A1 | 3/2002 | Mikosza |
| 2007/0241233 A1 | 10/2007 | Cona |
| 2007/0241235 A1 | 10/2007 | Atchison |
| 2008/0087767 A1 | 4/2008 | Scott |
| 2009/0127911 A1 | 5/2009 | Schumacher et al. |
| 2010/0282902 A1 | 11/2010 | Rajasingham |
| 2010/0295358 A1 | 11/2010 | Lee |
| 2011/0031772 A1 | 2/2011 | Mabuchi et al. |
| 2011/0175411 A1 | 7/2011 | Wagner et al. |
| 2011/0272991 A1 * | 11/2011 | Saxton ............... B64D 11/06 297/411.46 |
| 2012/0274108 A1 | 11/2012 | Kim |
| 2012/0292957 A1 | 11/2012 | Vergnaud et al. |
| 2012/0305705 A1 | 12/2012 | Vergnaud et al. |
| 2013/0193726 A1 | 8/2013 | Rajasingham |
| 2015/0014481 A1 | 1/2015 | Vandewall |
| 2015/0166181 A1 | 6/2015 | Scott |
| 2015/0202992 A1 | 7/2015 | Cailleteau |
| 2015/0210395 A1 | 7/2015 | Saint-Jalmes |
| 2016/0009397 A1 | 1/2016 | Rajasingham |
| 2016/0150887 A1 | 6/2016 | Wallis |
| 2016/0318611 A1 | 11/2016 | Brownjohn et al. |
| 2018/0105272 A1 | 4/2018 | Scott |

FOREIGN PATENT DOCUMENTS

| | | |
|---|---|---|
| CN | 102849212 A | 1/2013 |
| CN | 104507808 A | 4/2015 |
| CN | 102753436 B | 5/2015 |
| CN | 105857328 A | 8/2016 |
| CN | 102849212 B | 3/2017 |
| DE | 102010019192 A1 | 11/2011 |
| EP | 0658477 A1 | 6/1995 |
| EP | 0747286 | 12/1996 |
| EP | 1801010 | 6/2007 |
| EP | 1864850 | 12/2007 |
| EP | 2214927 A1 | 8/2010 |
| EP | 2 471 684 A1 | 4/2012 |
| EP | 2520491 A1 | 7/2012 |
| EP | 2507131 A2 | 10/2012 |
| EP | 2214927 B1 | 11/2013 |
| EP | 2507131 B1 | 2/2017 |

(56) References Cited

FOREIGN PATENT DOCUMENTS

| | | |
|---|---|---|
| FR | 2953168 A1 | 2/2009 |
| FR | 2949214 A1 | 2/2011 |
| GB | 2455130 B | 3/2009 |
| GB | 2514356 A | 11/2014 |
| GB | 2514356 B | 11/2017 |
| WO | 9002685 | 3/1990 |
| WO | 2008043430 | 4/2008 |
| WO | 2011067286 A2 | 6/2011 |
| WO | 2011067286 A3 | 6/2011 |
| WO | 2011081289 | 7/2011 |
| WO | 2013185035 A1 | 12/2013 |
| WO | 2014011320 | 1/2014 |
| WO | 2014161853 A1 | 10/2014 |
| WO | 2016168200 A1 | 10/2016 |

OTHER PUBLICATIONS

English Abstract of CN102015358, Apr. 13, 2011, 1 pp.
English Abstract of CN102753436A, Oct. 24, 2012, 1 pp.
English Abstract of CN102753436B, May 13, 2015, 2 pp.
English Abstract of CN102849212A, Jan. 2, 2013, 2 pp.
English Abstract of CN102849212B, Jan. 2, 2013, 2 pp.
English Abstract of CN104507808A, Apr. 8, 2015, 2 pp.
English Abstract of CN105857328A, Aug. 17, 2016, 2 pp.
English Abstract of DE102010019192, Nov. 10, 2011, 1 pp.
English Abstract of EP2507131B1, Feb. 22, 2017, 2 pp.
English Abstract of FR2953168, Jun. 3, 2011, 2 pp.
Coffey, Helen, "New aeroplane design could see passengers Fighting over who gets the Middle seat", Jan. 25, 2017, http://www.express.co.uk/travel/articles/758728/flight-side-slip-seat-design, 2017.

* cited by examiner

STAGGERED AIRCRAFT SEAT ASSEMBLY

CROSS REFERENCE

The present application claims the benefit of the filing date of U.S. Provisional Application No. 62/409,493, having a filing date of Oct. 18, 2016, the entire contents of which is incorporated herein by reference.

FIELD

The present disclosure is generally directed to a seating system primarily for aircraft. More specifically, the present disclosure is directed to a staggered seating system that increases seating and elbow room for passengers.

BACKGROUND

A conventional aircraft seating unit typically has a frame construction that carries a set of two or more seats and more commonly a set of three, four or five seats each of which include a seating surface and a seatback. In a conventional configuration, the seats are aligned. An armrest is located on each side of the seat surface such that one armrest exists between each pair of adjacent seats. This arrangement requires that passengers share an arm rest. Commonly, one passenger utilizes the armrest while an adjacent passenger cannot utilize the armrest due to space limitations. This significantly limits the space and comfort of the passenger who is not able to utilize the armrest.

SUMMARY

Aspects of the presented inventions are directed to a passenger seat set that provides extra room for passengers without increasing the overall footprint of the seat set. One non-limiting application is for aircraft passenger seating. However, such a seat set(s) may be utilized in other passenger seating applications including, without limitation, bus and/or train seating.

According to one aspect, a multiple seating unit or seat set is provided that increases seating room and comfort for passengers. The seat set includes a staggered seating arrangement where seating surfaces of adjacent seats are disposed in alternating heights (e.g., vertical heights) while the seating surfaces and seat backs of such adjacent seats are disposed in alternating forward and back positions. The staggering of the seat surfaces (e.g., elevated, lowered, elevated . . . ) and seat backs (e.g., forward, back, forward . . . ) results in misalignment of shoulders and hips of passengers in adjacent seats. This misalignment provides adjacent passengers access to overlapping spatial envelopes. That is, a first passenger seated in a seat that is forward and above an adjacent second passenger seated in a lowered and rearward seat has access to space above the legs/hips of the second passenger and space in front of the shoulders of the second passenger.

In an exemplary three seat arrangement, the seat set includes two outboard seats and a center or middle seat disposed between the outboard seats. In this arrangement, the seating surfaces of the outboard seats may be disposed above the seating surface of the middle seat. Likewise, the seatbacks of the outboard seats may be disposed in front of the seatback of the middle seat. This configuration may be reversed in another arrangement. In a three seat arrangement, the outboard seats include first and second or outer and inner armrests. The outer armrests are 'unshared armrests' as they not shared with an adjacent seat while the inner armrests are 'shared armrests' that are shared by passengers occupying the outboard seat and the center/middle seat. In other seat set arrangements (e.g., four seat sets, five seat sets, etc.), outer seats of the seat set may have one unshared armrest and one shared armrest. One or more inner seats may have two shared armrests. In any seating set arrangement, adjacent seats alternate in the staggered seating arrangement.

Each shared armrest is a two-level armrest having a first portion configured for use with a lower seat surface (e.g., middle seat surface in three seat set) and a second portion configured for use with a raised seat surface (e.g., an outboard seat surface in a three seat set). More specifically, the arm rest incudes a rearward portion and a forward portion having different elevations (e.g., heights as measured from a floor of the aircraft or transport vehicle), when the armrest is in a deployed position. In one arrangement, the rearward portion of the armrest is a lower portion while the forward portion of the armrest is a higher/elevated portion. Referring by way of example to a three seat set, a passenger sitting in the middle seat (lowered seat surface) has two armrests that are shared with the passengers in the outer seats. Due to the multi-elevation design of the shared armrest, the middle passenger utilizes the lower rearward portion of the shared armrests while the outboard passengers utilize the elevated portions of the shared armrests. By staggering the seats, passengers are allowed to use different portions of the shared armrests and thereby are afforded additional elbowroom. Further, as the outboard seats have additional elbowroom, the width of these seats may be reduced in comparison to the width of the center seat. For instance, the center seat may have a width that is between 1.05 and 1.5 times the width of the outboard seats. In such an arrangement, the outboard seats may be identically configured. However, this is not a requirement.

In a further arrangement, the staggered seats are attached to a frame using spreaders. Adjacent seats utilize a shared spreader. The shared spreader has an elevated support surface and a lowered support surface. These support surfaces allow attaching seat surfaces to the frame at different heights.

DETAILED DESCRIPTION

Reference will now be made to the accompanying drawings, which at least assist in illustrating the various pertinent features of the present disclosure. The following description is presented for purposes of illustration and description and is not intended to limit the disclosed inventions to the forms disclosed herein. Consequently, variations and modifications commensurate with the following teachings, and skill and knowledge of the relevant art, are within the scope of the presented inventions. The embodiments described herein are further intended to explain the best modes known of practicing the inventions and to enable others skilled in the art to utilize the inventions in such, or other embodiments and with various modifications required by the particular application(s) or use(s) of the presented inventions.

Many conventional passenger aircraft include multiple seat sets across the width of the passenger cabin. For instance, regional jets may include two sets of three passenger seats separated by an aisle (e.g., a 3×3 6-abreast configuration). Long-haul jets typically include three sets of seats separates by two aisles (e.g., a 3×3×3 9-abreast configuration; a 2×5×2 9-abreast configuration; a 3×4×3 10-abreast configuration, etc.). From the perspective of a long-haul airline, the rationale for a 10-abreast cabin is quite obvious. Not only does it provide a higher profit margin by providing additional seats (e.g., approximately 50 extra seats in a Boeing 777), thereby lowering its cost per seat mile, but it (theoretically) allows these savings to be put into other benefits for travelers in the form of cheaper airfares or enhanced services. In this sense, a denser cabin allows airlines to move greater numbers of passenger on fewer flights, which leads to fuel efficiency in the form of equated fuel burn reduction savings. However, increasing abreast seat density compromises passenger comfort. Each passenger has less lateral space.

The present disclosure primarily discusses an aircraft seat set. Though discussed in relation to a three-seat passenger seat set, it will be expressly understood that such discussion is by way of example and not by way of limitation. Various aspects of the present disclosure have applicability to differently configured seat sets including, without limitation, two passenger seat sets, four passenger seat sets, and five passenger seat sets, to name a few. Further, it will be expressly understood that the disclosed seat sets have applicability in applications other than aircraft seating. Such applications include, without limitation, bus seating and train seating. In any arrangement, the seat sets are typically installed in the passenger cabins of a transport vehicle (e.g., airline, bus, train etc.). Aspects of the present disclosure are directed to providing enhanced room and comfort for passengers sharing a common seat set having two or more individual seats.

Figure 1:
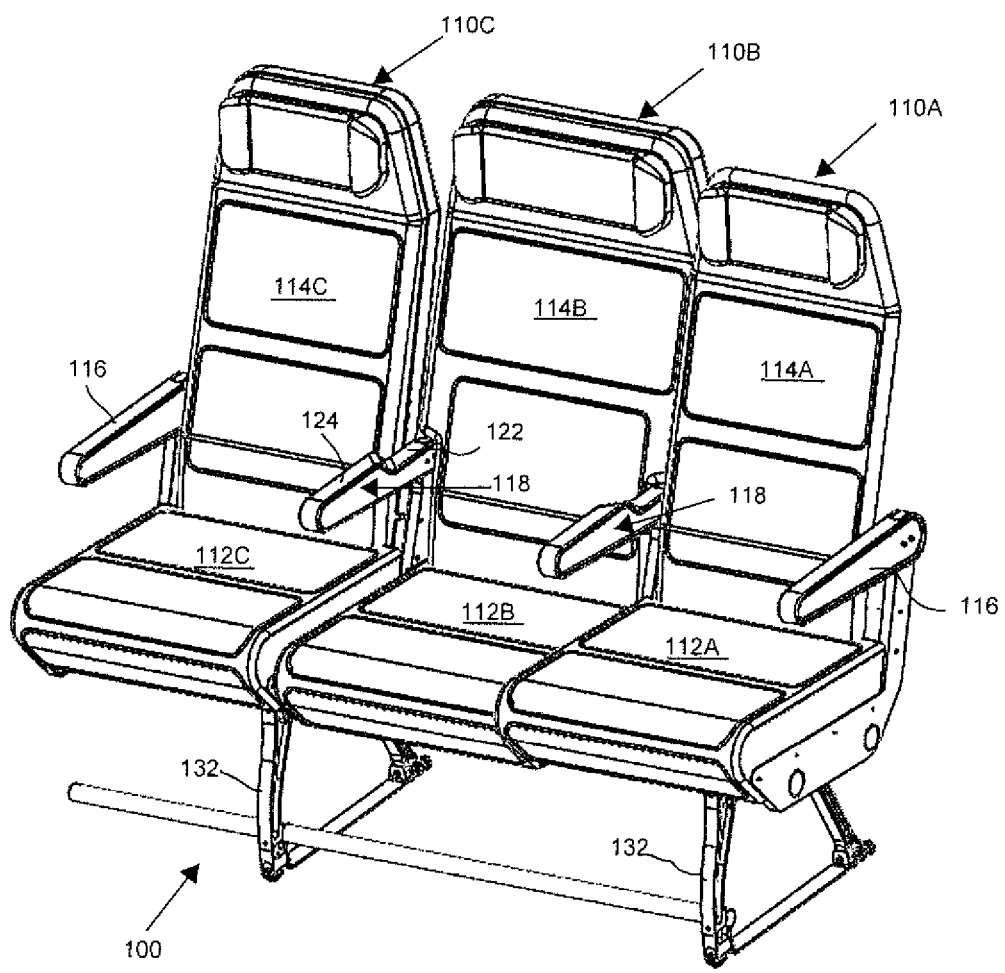
FIG. 1 illustrates one exemplary embodiment of a staggered seat set having three passenger seats.

FIG. 1 illustrates a perspective view of one embodiment of a three-seat passenger seat unit or seat set 100. In one embodiment, the seat set is utilized for aircraft seating. In other embodiments, the seat set is used for other modes of passenger transportation such as buses and trains. As shown, the seat set 100 includes three seats 110A, 110B and 110C. These three seats 110A-110C are mounted to a common base frame having two or more legs 132 adapted for attachment to a flooring surface of a passenger transport vehicle such as an aircraft cabin. Each of the seats 110A, 110B, and 110C includes a seat surface 112A, 112B and 112C and a seat back 114A, 114B and 114C, respectively. In the three-seat arrangement illustrated in FIG. 1, the outer or outboard seats 110A and 110C are disposed on either side of the middle seat 110B. The outer seats 110A and 110C each include an outer armrest 116 and an inner armrest 118 while the middle seat includes two inner armrests. The armrests 116, 118 typically attach to the sides of the seatback or to the seat frame (e.g., frame spreader). Such armrests typically pivot between an upright stowed position (e.g., vertical position; not shown) and a deployed horizontal position as shown in FIG. 1. However, this is not a strict requirement. The outer armrests 116 are not shared with an adjacent seat (e.g., unshared armrests). In the three seat arrangement, the inner armrests 118 are shared by passengers occupying one of the outboard seats 110A or 110C and the center/middle seat 110B (e.g., shared armrests). In other seat set arrangements (e.g., four seat sets, five seat sets, etc.), outer seats of the seat set typically have one unshared armrest and one shared armrest while inner seats may each have two shared armrests.

Figure 2A:
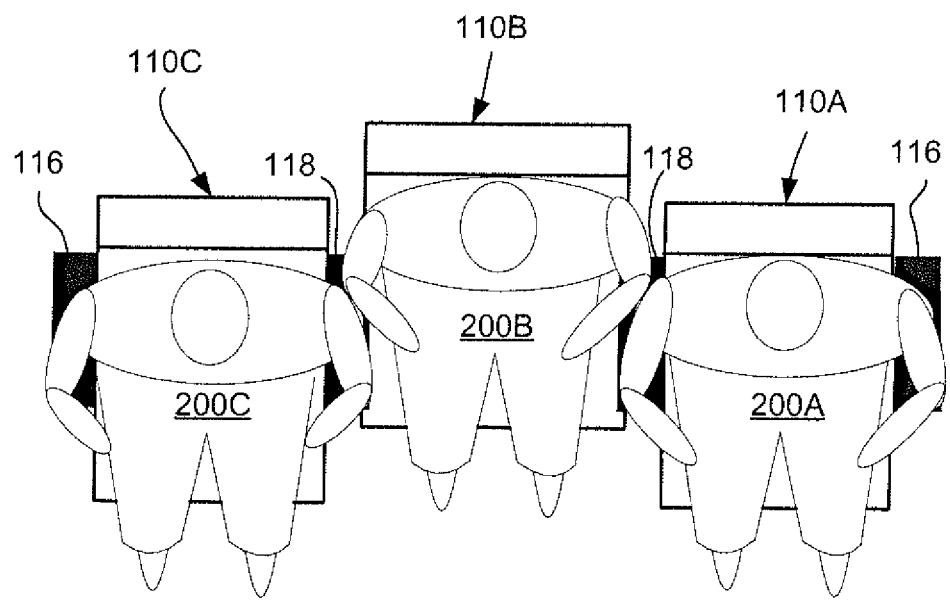
FIG. 2A illustrates three passengers seated in a staggered seat set.

For purposes of discussion, and not by way of limitation, seats 110A and 110B may be referred to as outboard seats. In one application, one of these outboard seats 110A may be an aisle seat and seat 110C may be a window seat. However, it will be appreciated that the seat set 100 may be utilized in a central row of, for example, an aircraft cabin in which case outboard seats 110A and 110C would both be aisle seats. Such nomenclature is utilized by way of convenience and not by way of limitation. Further and as previously noted, the seat set is not limited to a unit having three seats. In any multiple seat set having three or more seats, a passenger 200B sitting in an inner seat (e.g., middle seat 110B flanked by two seats) shares the shared armrests 118 with passengers 200A, 200B occupying adjacent seats (e.g., outboard seats 110A and 110C). This is illustrated in FIG. 2A.

Figure 3A:
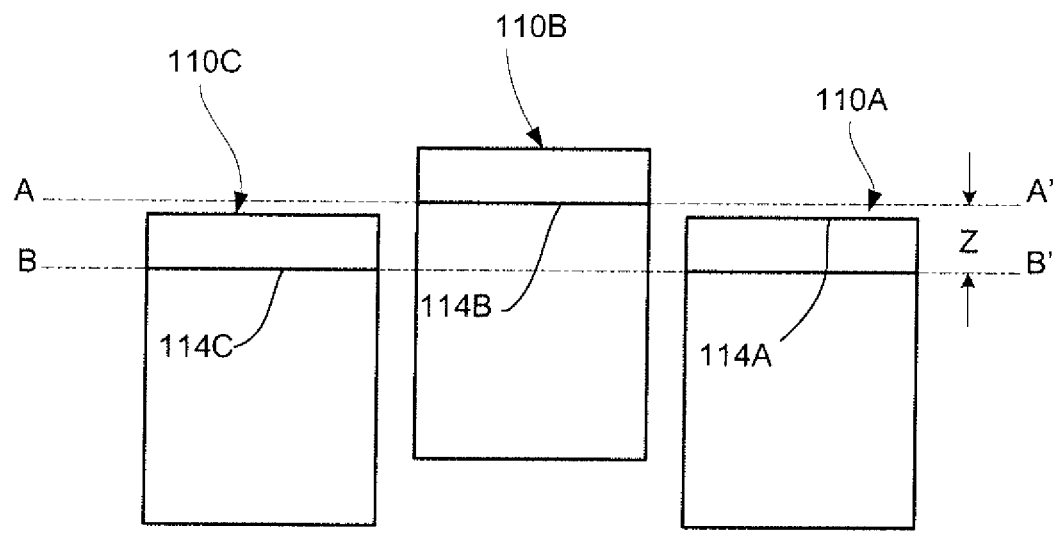
FIG. 3A illustrates a simplified top view of the staggered seat set of FIG. 1.
Figure 3B:
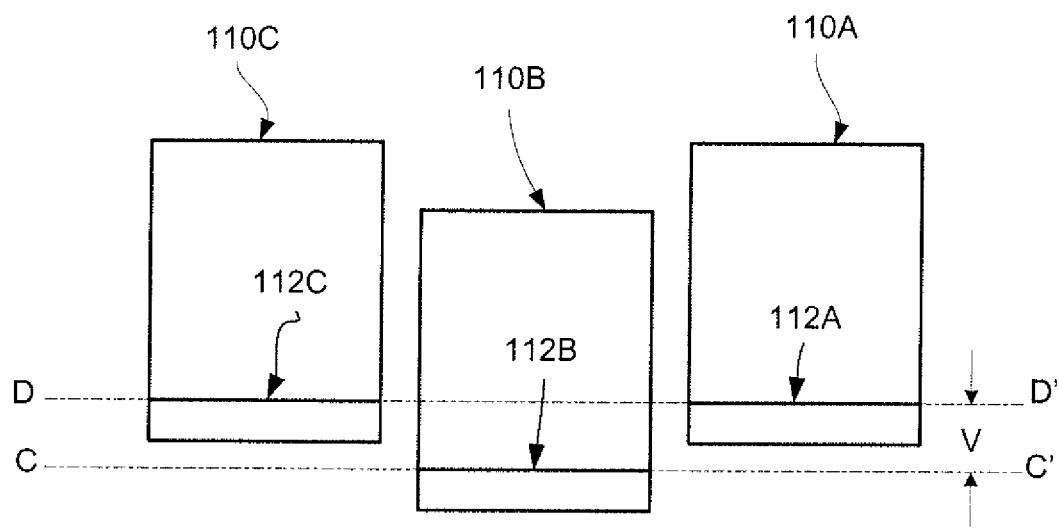
FIG. 3B illustrates a simplified front view of the staggered seat set of FIG. 1.

As shown in FIG. 1, the seat set 100 utilizes a staggered seat arrangement. Specifically, the seating surface 112B of the middle seat 110B is disposed below the seating surface 112A of the outboard seats 110A and 110C. Furthermore, the seat back 114B is disposed behind the seatbacks 114A, 114C of the outboard seats 110A, and 110B. This is further illustrated in FIGS. 3A and 3B which illustrate a simplified top view of the seat set 100 and a simplified front view of the seat set 100, respectively. As shown in the top view of FIG. 3A the front surface of the seat back 114B of the middle seat 110B generally defines a reference plane A-A'. In the present embodiment, the surfaces of the seat backs 114A and 114C of the outboard seats 110A and 110C are likewise disposed in a common reference plane B-B'. Though being discussed as being in a common plane, it will be appreciated that the surfaces of these seatbacks 114 need not be planer nor do the reference plane or common planes need to be strictly vertical or horizontal. What is important is that the seatback 114B of the middle seat 110B is disposed a distance behind the seat backs 114A and 114C of the outboard seats 110A, 110C. Stated otherwise, reference plane A-A' is located a distance 'Z' behind the plane B-B' of the outboard seats 110A and 110C. Likewise, referring to FIG. 3B it is noted that the top surface of the seating surface 112B of the center seat 110B is disposed in a plane C-C' that is located a distance 'V' beneath the plane D-D' of the seat surfaces 112A, 112C of the outboard seats 110A and 112C. Stated otherwise, the seats are staggered forward and back as well as up and down.

Figure 2B:
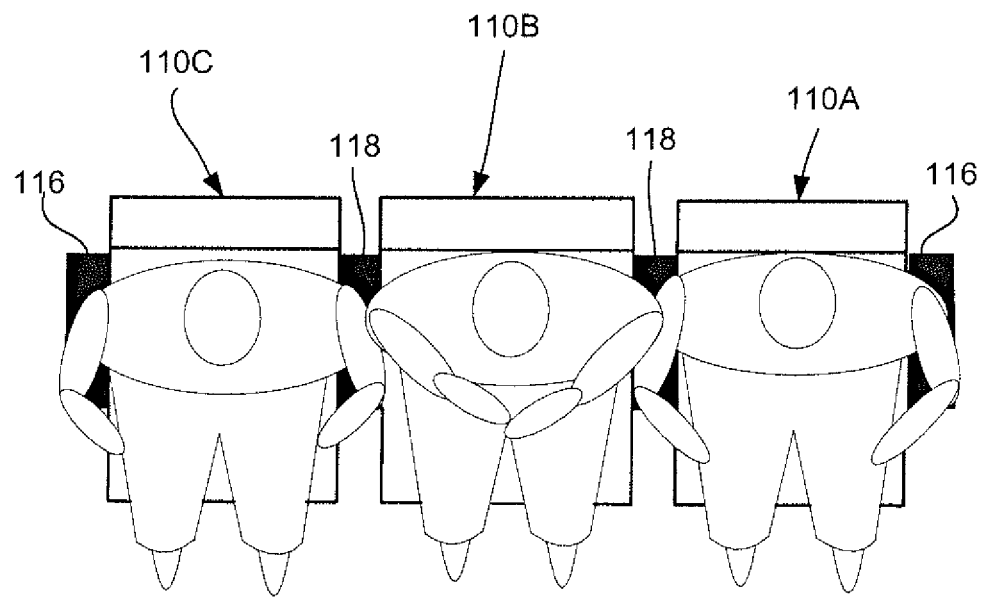
FIG. 2B illustrates three passengers seated in a prior art seat set.

Utilization of the staggered seat arrangement provides additional shoulder, hip and elbow room for passengers. As illustrated in FIG. 2B, three passengers 200A, 200B and 200C are seated in a standard seat set having aligned seat surfaces and seat backs. In this illustrated embodiment, the middle passenger 200B is prevented from using the shared armrests. In addition, due to the alignment of the seat surfaces and seat backs, the shoulders of each of the three passengers 200A, 200B and 200C are substantially aligned. This can result in the passengers attempting to share the same physical space if the seats are densely packed and/or if the passenger are average size or larger. In contrast, FIG. 2A illustrates the same three passengers 200A, 200B and 200C seated in the seats 110A-110C of the staggered seat set 100. As shown, the staggering of the seat backs (e.g., forward and back) results in misalignment of shoulders of passengers in adjacent seats. This misalignment allows adjacent passengers to utilize overlapping spatial envelopes. That is, a first passenger 200A sits in a seat 110A forward and above a second adjacent passenger 200B sitting in a lowered and rearward seat 110B (e.g., adjacent middle seat 110B). The first passenger 200A has access to space in front of the shoulders of the second passenger 200B. Likewise, the second passenger has access to space behind the shoulders of the first passenger 200A. A similar benefit is afforded to these passenger 200A and 200B due to the different elevations of the seat surfaces. That is, their hips and legs are misaligned providing each with additional room that was not previously available. Of note, the additional room afforded to each passenger does not require any increase in the overall width of the seat set.

In addition to providing passengers additional space due to misalignment, the staggered seats additionally provide each passenger access to a different portion of the shared armrests 118. In the illustrated embodiment, the outboard seats 110A and 110C are disposed forward of the middle seat 110B. This permits the outboard passengers 200A and 200C to utilize a forward portion of the shared armrests 118 while the middle passenger 200B utilizes a rearward portion of the shared armrest 118. In this regard, all three passenger 200A, 200B and 200C realize additional elbow room not previously available.

While the passengers are afforded access to different portions of the shared armrests, in an arrangement where the middle seat 110B (or other seat) has a lower seat surface height (e.g. relative to the floor of the passenger vehicle) relative to the seat surfaces of the adjacent seat(s), the height of the shared armrest would be elevated above a standard height if the armrest had a single upper support surface (e.g., substantially planar upper surface). Such an arrangement would reduce the usefulness of the staggered design especially for shorter passengers that may find the armrests uncomfortably high/elevated.

To account for the differing height of elevated seats (e.g., outboard seats 110A and 110C) relative to the height of a lowered seat (e.g., middle seat 110B), the presented seat set utilizes a novel armrest arrangement. More specifically, when the shared armrests 118 are deployed in a generally horizontal position, the armrests have a two-tier or stair-step arrangement where a rearward portion 122 of a top support surface of the shared armrest is lower than a forward portion 124 of the top support surface of the shared armrest 118 (e.g., as measured from a floor surface of a passenger vehicle such as an aircraft), as illustrated in FIGS. 1 and 4A-4C. In the illustrated embodiment, the armrest also includes a transition portion 126 that transitions from the elevation of rearward portion 122 to the elevation of the forward portion 124. The two portions 122 and 124 are designed to allow a user to rest their arm/elbow on the armrest at different locations and at different heights based on the staggered seat design. In the illustrated embodiment, the transition portion 126, in addition to extending between the two surfaces of the forward and rearward portions 122, 124, also angles toward the front of the seat surface of lowered seat. More particularly, the angled transition portion 126 is disposed at an oblique angle Θ relative to a centerline axis E-E' of the arm rest. See FIGS. 4A and 4C. This angled transition portion 126 directed toward the front of the lowered seat, provides a comfortable abutment for a forearm of a passenger and limits forward movement of an elbow of a passenger seated in the lowered seat. Though discussed as utilizing an armrest with a continuous support surface have two tiers, it will be appreciated that the armrest is not limited to such a configuration. By way of example, FIG. 4D illustrates an alternate embodiment of a two-tier armrest 118 having a lower portion 122 and an upper portion 124. In this embodiment, the upper and lower portions 122, 124 are defined by first and second cushions 123, 125 that are attached to a frame 127. This embodiment does not have a transition between the support surfaces of the armrest. Numerous different embodiments of two-tiered armrests are possible and within the scope of the present disclosure.

Figure 4A:
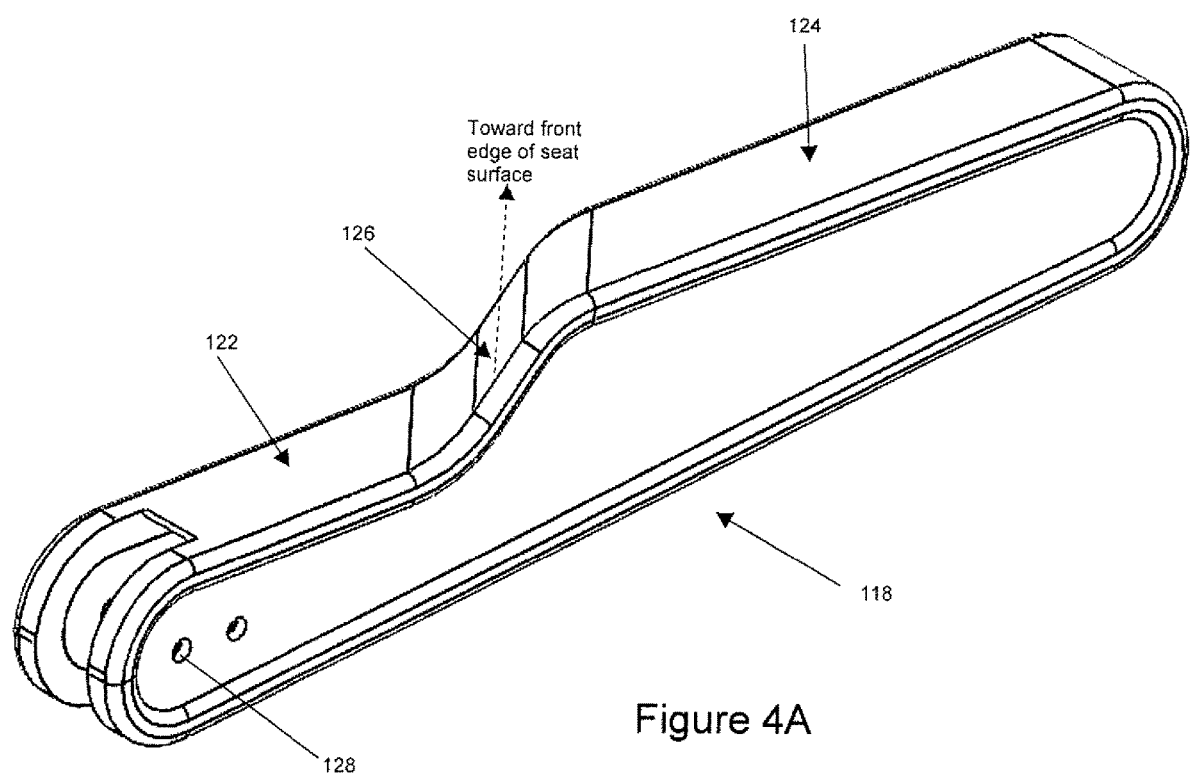
FIGS. 4A-4C illustrate perspective, side and top views, respectively of a multi-level armrest.
Figure 4B:
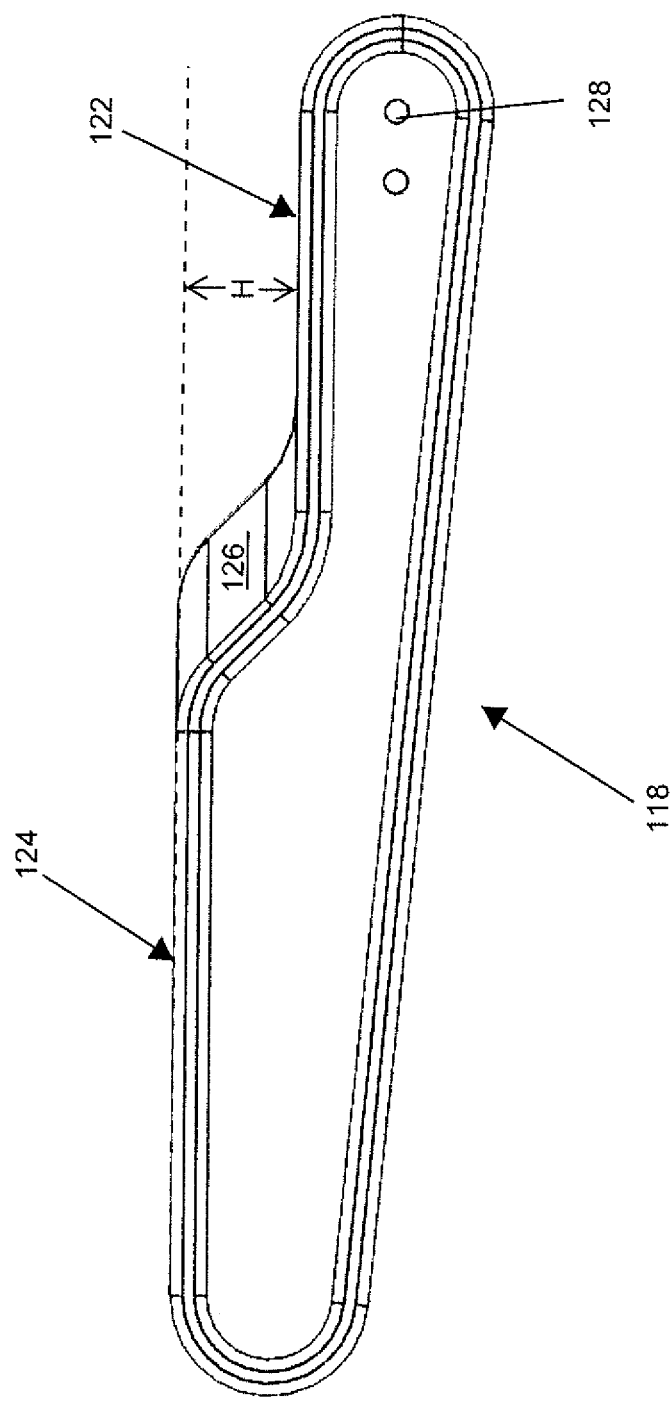
Figure 4C:
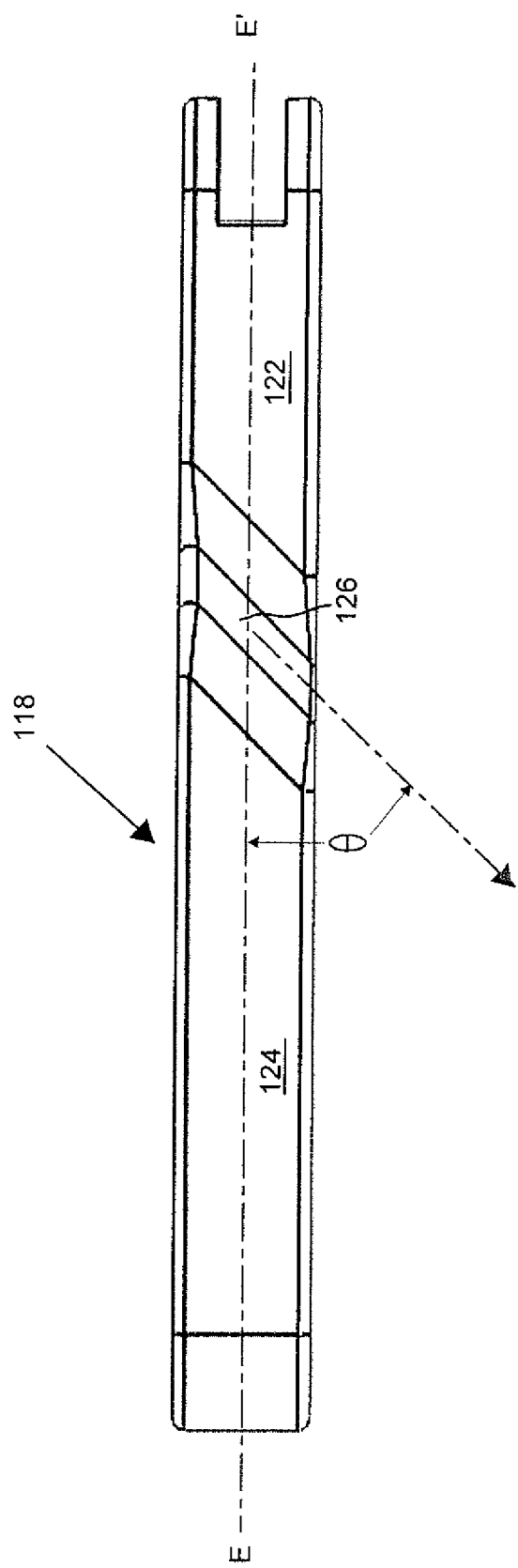
Figure 4D:
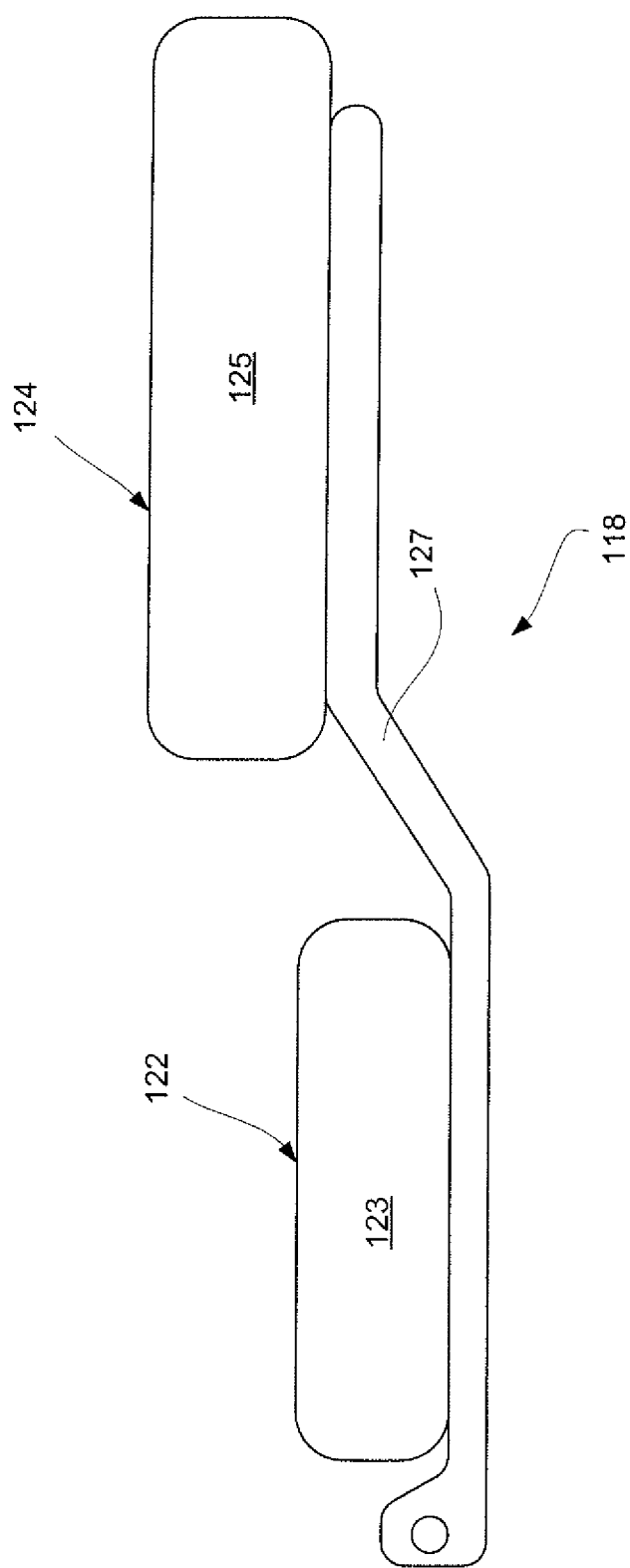
FIG. 4D illustrates an alternative view of a multi-level armrest.
Figure 5:
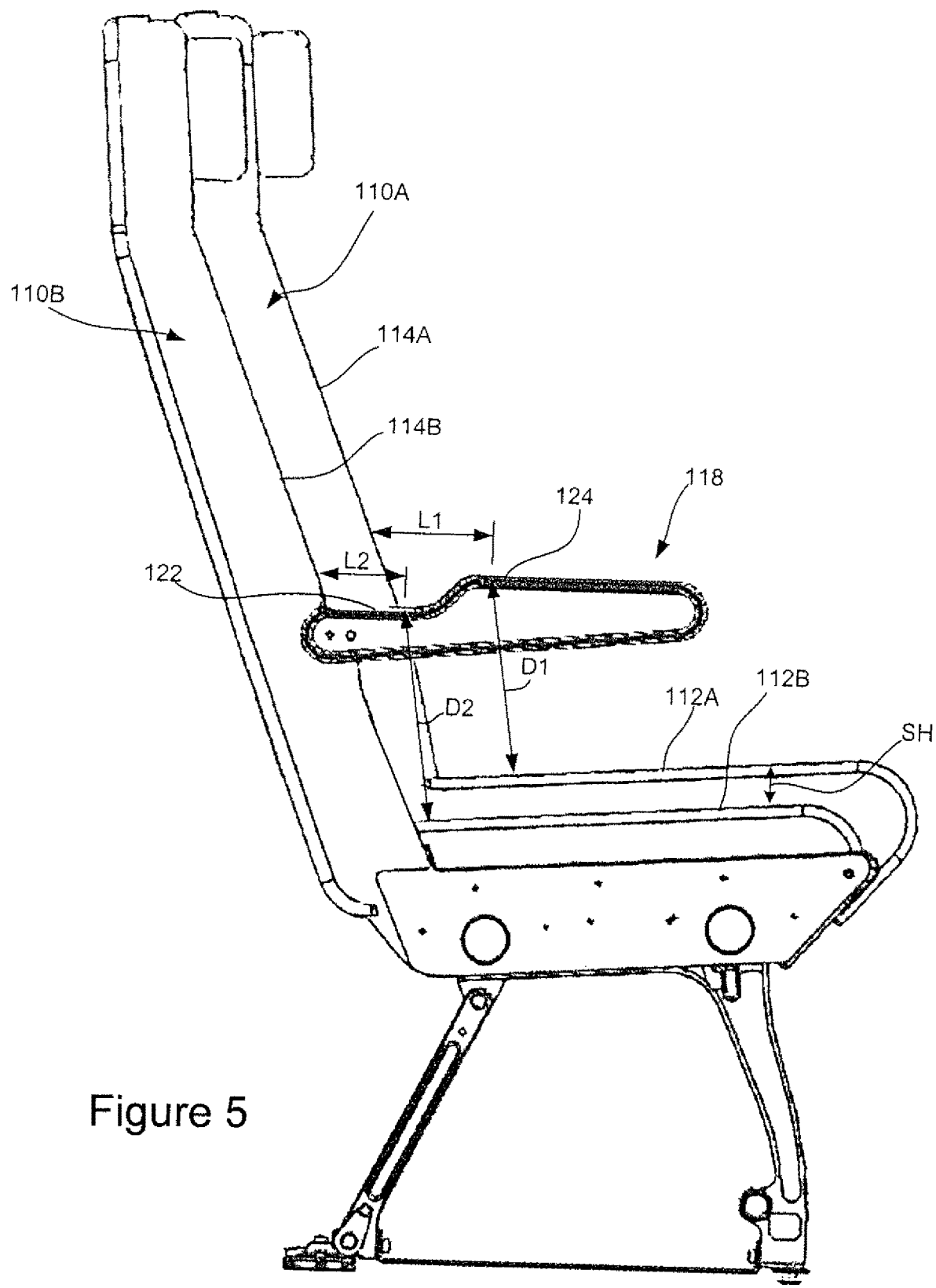
FIG. 5 illustrates a side view of a staggered seat set having a multi-level armrest.

FIG. 4B best illustrates the offset between the surfaces of the rearward portion 122 and forward portion 124 of the shared armrest. As illustrated the top surfaces of these portions 122, 124 of the shared armrest 118 are offset a distance 'H' to at least partially account for the difference in the heights of the staggered seating surfaces. The difference in the heights of the seating surface of aisle seat 110A and middle seat 110B is illustrated in FIG. 5, where one of the raised/elevated seats (e.g., seat 110C) is removed for purposes of illustration. As shown, the seating surface 112A of the outboard seat 110A is disposed a distance 'SH' above the seating surface 112B of the middle seat 110B. In one embodiment, the offset H between the armrest surface portions 122, 124 is at least 50% of the difference SH between the seating surfaces 112A, 112B of the staggered seats 110A, and 110B. In another embodiment, the offset H is at least 75% of the seat height difference SH. In a yet further embodiment, the offset H is substantially equal to the seat height difference SH. Stated otherwise, the height D1 of the forward armrest portion 124 above the outboard seat surface 112A (e.g., elevated seat surface) and the height D2 of the rearward armrest portion 122 above the middle seat surface 112B (e.g., lowered seat surface) may be similar or identical. In any embodiment, the offset H between the rearward portion 122 and forward portion 124 of the shared armrest 118 allows middle seat passenger to utilize a rearward portion of the armrest at a height that is much closer to a standard armrest height. In one exemplary embodiment, seat height difference SH is approximately 2 inches. In this exemplary embodiment the height D1 of the forward portion 124 of the shared armrest 118 above the outboard seat surface 112A is approximately 8 inches. Further the height D2 of the rearward portion 122 of the shared armrest 118 above the middle seat surface 112B is approximately 9 inches. That is the offset H of the shared arm rest is approximately one inch. In this arrangement, the offset H is 50% of the seat height difference SH.

In addition to providing similar heights, the shared armrest 118 may also be configured to extend similar distances in front of the seatback surfaces 114A, 114B of the staggered seats 110A, 110B. In this regard, the forward surface portion 124 of the armrest has a resting surface for a first passenger's elbow that is a first distance L1 in front of the outboard seat back 114A and the rearward surface portion 122 of the armrest has an resting surface for a second passenger's elbow that is a second distance L2 in front of the middle seat back 114B. As with the differing heights, the distances L1 and L2 are similar such that passengers of the staggered seats may enjoy similar conditions. However, this is not a strict requirement. Of further note, the forward and rearward portions 122, 124 of the armrest 118 may have differing lengths and their surfaces need not be planar. That is, these surface may be contoured (e.g., rounded) padded, etc. Likewise, the transition portion may take any appropriate configuration and/or be omitted.

Figure 6:
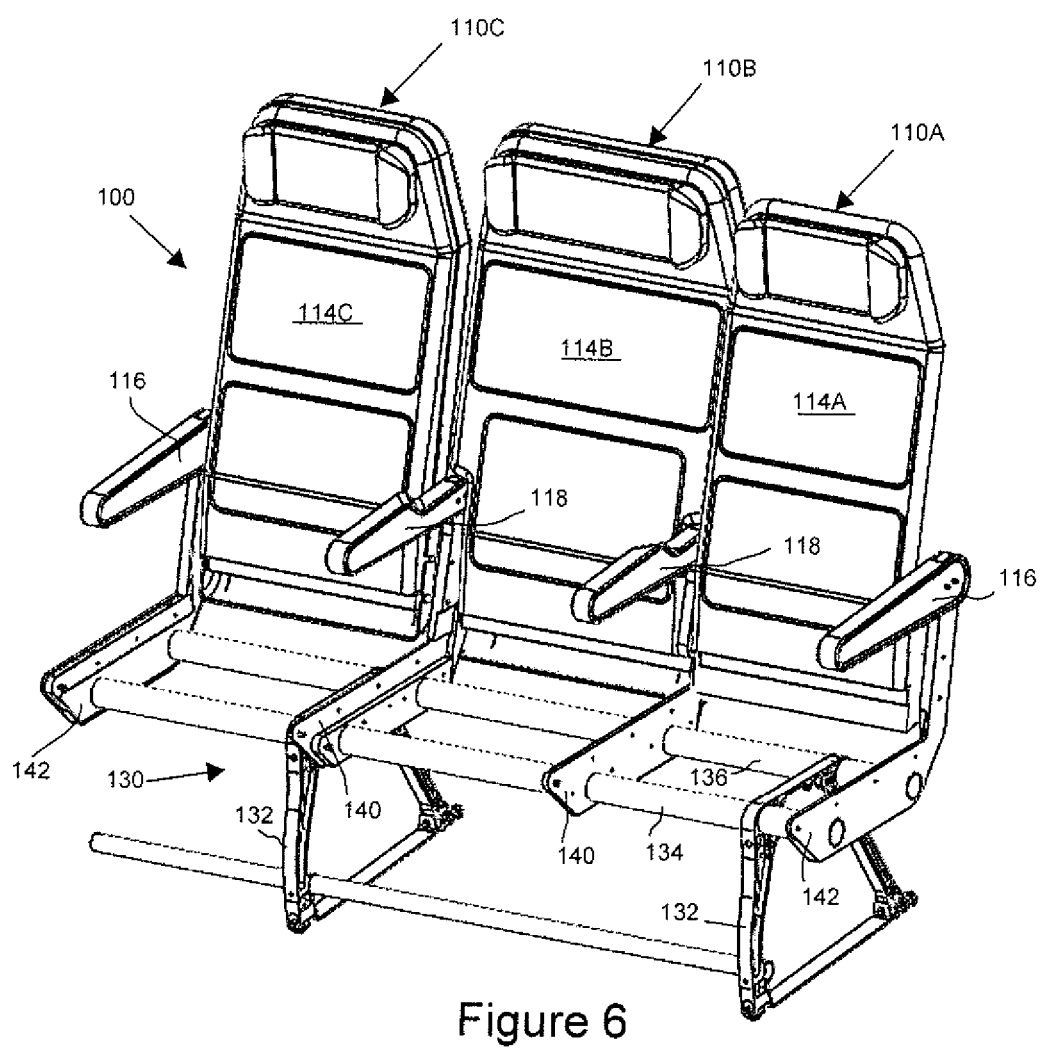
FIG. 6 illustrates the exemplary staggered seat set of FIG. 1 with the seat cushions removed to show the seat frame.

In order to produce the staggered seating arrangement, it is necessary that the base frame of the seat set support the seat surfaces of adjacent seats at different elevations (e.g., vertical stagger) as well as supporting the seat surfaces and seat back at different forward and back positions (e.g., horizontal stagger). FIG. 6 illustrates the seat set 100 of FIG. 1 with the seat cushions and seat supports surfaces removed to illustrate the base frame of the seat set 100. As shown, the base frame 130 is formed by a pair of stretcher tubes or rails 134, 136 which extend across the front and rear of the seat set 100 and which are supported by two leg assemblies 132 spaced along the length of the stretcher tubes. More specifically, in the illustrated embodiment, the legs 132 each include a forward aperture sized to receive and support the forward stretcher tube 134 and a rearward aperture sized to receive and support the rearward stretcher tube 134. As shown, the forward stretcher tube 134 and the rearward stretcher tube 136 are supported in a parallel, spaced-apart relationship to one another. Also connected to the stretcher tubes are spreaders 140, 142 that connect the seats (seat surfaces and seat backs) to the frame. The spreaders 140 also include forward and rearward apertures that receive the forward and rearward stretcher tubes such that the spreaders are supported by the stretcher tubes. Both the legs 132 and spreaders 142 may be positioned at desired/needed locations along the length of the stretcher tubes. Stated otherwise, the spacing of spreaders 140, 142 and legs 132 along the length of the stretcher tubes 134, 136 will vary for different types of seats and different seating arrangements. The position of legs on seats nearest the aisle and seats nearest the wall of the aircraft may vary depending upon the structural design of the aircraft, the number of seats in the row and the location of the row of seats in the aircraft.

In the illustrated embodiment, the seat set 100 includes outer spreaders 142 disposed on the ends of the stretcher tubes 134, 136 and inner or shared spreaders 140 positioned along the length of the stretcher tubes 134, 136. In various different arrangements, these spreaders 140, 142 may be identically configured or may be differently configured. For instance, the outer spreaders 142 may be designed to attach a single seat surface at a single height. In contrast, the shared spreaders 140 are configured to support first and second seat surfaces at first and second different vertical heights and at different forward and rearward positions (hereafter 'horizontal positions').

Figure 7:
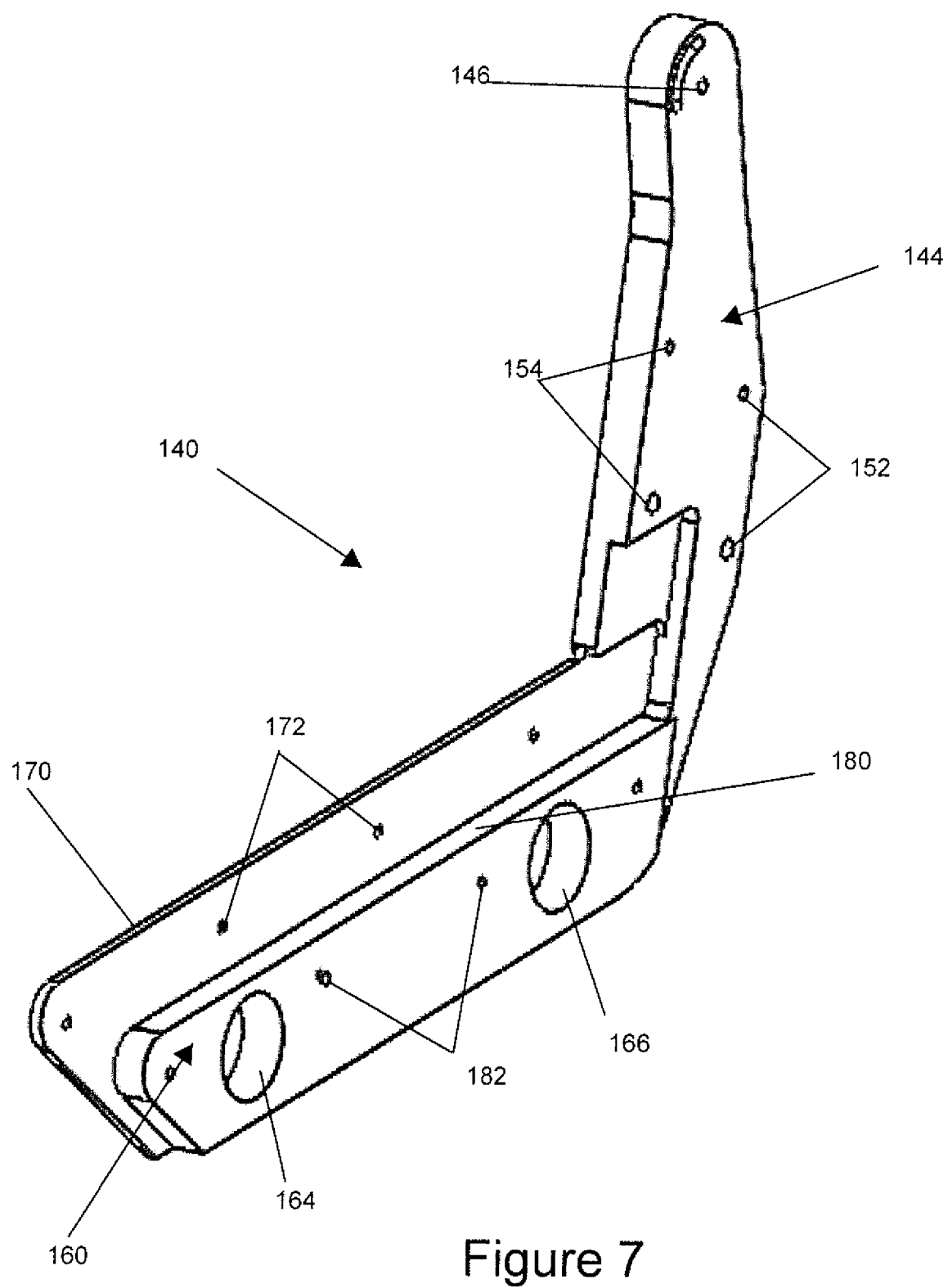
FIG. 7 illustrates a two-level shared spreader.

FIG. 7 illustrates one embodiment of a shared spreader 140 that supports two seat surfaces at different heights and different horizontal positions. In the illustrated embodiment, the shared spreader 140 is formed as a single piece. For instance, the shared spreader may be formed of machined aluminum or may be formed of composite materials. The spreader 140 is generally an L-shaped member configured to fit between adjacent seats. An upper or vertical leg 144 of the L-shaped spreader 140 includes a pivot aperture 146 that is adapted to engage a mating pivot aperture 128 in the shared armrest 118. See, e.g., FIGS. 4A and 4B. In this regard, an axel pin, bolt or similar element may be disposed through the mating apertures to allow the armrest a pivot relative to the spreader 140. The vertical leg 144 further includes a first set of seatback apertures 152 for attachment to a rearward seatback (e.g., seatback 114B as illustrated in FIG. 6) and a second set of seatback apertures 154 for attachment to a forward seatback (e.g., seatback 114C as illustrated in FIG. 6).

The L-shaped spreader member 140 also includes a horizontal leg 160 that is adapted to engage first and second seat surfaces (e.g., seat surfaces 112B and 112C as shown in FIG. 1). As shown, the horizontal leg 160 includes forward and rearward apertures 164, 166 that are sized to receive the stretcher tubes 134, 136, respectively. Set screws (not shown) may extend through these apertures to fix the positon of the spreader 140 along the length of the stretcher tubes. The spreader 140 also includes an upper support edge 170 (e.g., upper or elevated support surface) that is configured to support the bottom of a raised or elevated seat surface (e.g., seat 112C as shown in FIG. 1). The spreader 140 also includes a lip or ledge 180 (e.g. lower support surface) that is configured to support a bottom surface of a lowered seat surface (e.g., seat surface 112B as shown in FIG. 1). A first set of apertures 172 in the horizontal leg are provided to affix the elevated seat surface relative to the upper support edge 170 and a second separate of apertures 182 are provided to affix the lowered seat surface relative to the support ledge 180. As shown, the height difference between the upper support edge 170 and the lower support ledge 180 is substantially equal to the seat height difference as discussed above in relation to the shared armrest. In the illustrated embodiment, the shared spreader 140 also includes a recess 182 in the vertical leg 144 that extends into the vertical leg 144. This recess is sized to accommodate a cushion of the lowered seat surface (e.g., seat surface 112B of FIG. 1).

The use of the two-level shared spreader 140 allows use of a single spreader to attach two different seat surfaces and seat backs to the stretcher tubes/frame 130 of the seat set 100. Further, by utilizing the top edge 170 to support the elevated seat surface, the edge of the elevated seat surface may extend to the edge of the lowered seat surface, though being disposed a distance above the lowered seat surface. The spreader is effectively covered by the seat surfaces. The entire width of the seat set is available for the supported seat surfaces as the spreader is disposed below the seat surfaces.

In a further arrangement, the widths of the individual seats 110A-C may be varied. In one embodiment, as illustrated in FIG. 1, the middle seat 110B may have a width that is greater than the width of the outboard seats 110A, 110C. For instance, the inner seat may have a width that is 1.05 to 1.4 times the width of the outboard seats. In this regard, the outboard seats 110A, 110C may be slightly narrowed to provide a seat set 100 that has the same footprint as a seat unit having three identical seats. In such an arrangement, the outboard seats 110A, 110C may be uniform in size to allow for interchangeability. However, the ability to increase the center seat may provide additional room for passengers having increased girth. However, it will be appreciated that all the seat surfaces may have common dimensions.

The foregoing description has been presented for purposes of illustration and description. Furthermore, the description is not intended to limit the inventions and/or aspects of the inventions to the forms disclosed herein. Consequently, variations and modifications commensurate with the above teachings, and skill and knowledge of the relevant art, are within the scope of the presented inventions. The embodiments described hereinabove are further intended to explain best modes known of practicing the inventions and to enable others skilled in the art to utilize the inventions in such, or other embodiments and with various modifications required by the particular application(s) or use(s) of the presented inventions. It is intended that the appended claims be construed to include alternative embodiments to the extent permitted by the prior art.

What is claimed is:

1. A multiple seat set for use in an aircraft, comprising:
a seat frame configured for attachment to a floor of an aircraft cabin;
first and second elevated seats supported by said seat frame and each including elevated seat surfaces and seat backs, wherein said elevated seat surfaces of said first and second elevated seats are disposed in a substantially common horizontal reference plane and said seat backs of said first and second elevated seats are disposed in a substantially common vertical reference plane;
a first lowered seat supported by said seat frame and disposed between said first and second elevated seats and having a lowered seat surface and a seat back, wherein said lowered seat surface is disposed beneath said horizontal reference plane and said seat back of said first lowered seat is offset from said vertical reference plane;
a first shared spreader attached to said seat frame and disposed between said first elevated seat and said first lowered seat and a second shared spreader attached to said frame and disposed between said second elevated seat and said first lowered seat, wherein each of said first and second shared spreaders attaches one of said elevated seat surfaces and said lowered seat surface to said seat frame, and wherein each of said first and second shared spreaders comprises an upper support surface configured to support one of said elevated seat surfaces and a lower support surface configured to support said lowered seat surface; and
a first shared armrest disposed between said first elevated seat and said first lowered seat and a second shared armrest disposed between said second elevated seat and said first lowered seat, wherein each of said first and second shared armrests includes:
an upper portion configured for use with a respective one of said first and second elevated seats; and
a lower portion configured for use with said first lowered seat.

2. The seat set of claim 1, wherein a height offset between said upper portion of said shared armrest and said lower portion of said shared armrest is at least fifty percent (50%) of a distance between said horizontal reference plane and said middle seat surface.

3. The seat set of claim 2, wherein a height offset between said upper forward surface and said lower rearward surface is at least seventy-five percent (75%) of a distance between said horizontal reference plane and said middle seat surface.

4. The seat set of claim 1, wherein said upper portion of said shared armrest comprises a forward portion of said shared armrest and said lower portion of said shared armrest comprises a rearward portion of said shared armrest.

5. The seat set of claim 4, wherein said seat back of said lowered seat is offset behind said vertical reference plane.

6. The seat set of claim 1, wherein each shared spreader comprises:
an L-shaped spreader, wherein one of said shared armrests is pivotally attached to a vertical leg of said L-shaped spreader.

7. The seat set of claim 1, wherein a width of said lowered seat surface is greater than a width of said elevated seat surfaces.

8. A multiple seat set for use in an aircraft, comprising:
a base frame configured for attachment to a floor of an aircraft cabin,
at least three seats attached to said base frame, wherein seat surfaces of adjacent seats alternate between an elevated position and a lowered position, and wherein seat backs of said adjacent seats alternate between a forward position and a rearward position;
shared spreaders attached to said base frame and disposed between each adjacent pair of said seats, wherein each shared spreader attaches one elevated seat surface and one lowered seat surface to said seat frame, and wherein each shared spreader comprises an upper support surface configured to support said elevated seat surface and a lower support surface configured to support said lowered seat surface; and
shared armrests between each said adjacent pair of said seats, each shared armrest having:
an elevated portion configured for use by one of said adjacent pair of said seats having said elevated seat surface in said elevated position; and
a lowered portion configured for use by one of said adjacent pair of said seats having said lowered seat surface in said lowered position.

9. The seat set of claim 8, wherein a height offset between said elevated portion of said shared armrest and said lower portion of said shared armrest is at least fifty percent (50%) of a height difference between seat surfaces of said adjacent pair of seats.

10. The seat set of claim 8, wherein a height offset between said elevated portion of said shared armrest and said lower portion of said shared armrest is at least substantially equal to the height difference between seat surfaces of said adjacent pair of seats.

11. The seat set of claim 8, wherein said elevated portion of said shared armrest comprises a forward portion of said shared armrest and said lowered portion of said shared armrest comprises a rearward portion of said shared armrest.

12. The seat set of claim 8, wherein each shared spreader comprises:
an L-shaped spreader, wherein one of said shared armrests is pivotally attached to a vertical leg of said L-shaped spreader.

13. The seat set of claim 8, wherein said lowered seat surfaces of said seats in said lowered position are greater than widths of seat surfaces in said elevated position.

14. The seat set of claim 8, comprising:
wherein first and second of said seats are in said elevated position and a third seat, disposed between said first and second seats is in said lowered position.

15. The seat set of claim 14, further comprising:
a fourth seat disposed adjacent to one of said first and second seat, wherein said fourth seat is in said lowered position.

16. The seat set of claim 14, wherein a seat back of said third seat is disposed in said rearward position.

* * * * *